(12) United States Patent
Lee et al.

(10) Patent No.: US 11,638,332 B2
(45) Date of Patent: Apr. 25, 2023

(54) INDUCTION HEATING COOKING APPARATUS AND METHOD OF DISPLAYING COOKING INFORMATION THEREOF

(71) Applicant: Samsung Electronics Co., Ltd., Suwon-si (KR)

(72) Inventors: Kil Young Lee, Hwaseong-si (KR); Jung Hoon Kim, Suwon-si (KR); Se Hoon Park, Suwon-si (KR); Ji Woong Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 580 days.

(21) Appl. No.: 16/462,330

(22) PCT Filed: Nov. 21, 2017

(86) PCT No.: PCT/KR2017/013260
§ 371 (c)(1),
(2) Date: May 20, 2019

(87) PCT Pub. No.: WO2018/093234
PCT Pub. Date: May 24, 2018

(65) Prior Publication Data
US 2019/0373682 A1 Dec. 5, 2019

Related U.S. Application Data

(60) Provisional application No. 62/424,829, filed on Nov. 21, 2016.

(30) Foreign Application Priority Data

Mar. 23, 2017 (KR) .......................... 10-2017-0036575

(51) Int. Cl.
*H05B 6/12* (2006.01)
*H05B 6/02* (2006.01)
(Continued)

(52) U.S. Cl.
CPC ............ *H05B 6/062* (2013.01); *G03B 21/28* (2013.01); *G03B 29/00* (2013.01); *H05B 6/12* (2013.01)

(58) Field of Classification Search
CPC .......... H05B 6/062; H05B 6/12; G03B 21/28; G03B 29/00
See application file for complete search history.

(56) References Cited

U.S. PATENT DOCUMENTS

2010/0182136 A1* 7/2010 Pryor .................... G01F 23/292
340/425.5
2017/0023260 A1* 1/2017 Charpentier .......... F24C 15/102

FOREIGN PATENT DOCUMENTS

| CA | 2 950 886 A1 | 12/2015 |
|---|---|---|
| CN | 1445481 A | 10/2003 |

(Continued)

OTHER PUBLICATIONS

Chinese Office Action with English translation dated Mar. 3, 2021; Chinese Appln. No. 201780071672.3.
Korean Notice of Allowance with English translation dated Jun. 24, 2021; Korean Appln No. 10-2017-0036575.
(Continued)

*Primary Examiner* — Helena Kosanovic
*Assistant Examiner* — Ahmad Abdel-Rahman
(74) *Attorney, Agent, or Firm* — Jefferson IP Law, LLP

(57) ABSTRACT

An induction heating cooking apparatus and a method of displaying cooking information of the induction heating cooking apparatus are provided, and more particularly, an induction heating cooking apparatus and a method of dis-
(Continued)

playing cooking information of the induction heating cooking apparatus that provide cooking information to a user through a reflector positioned inside the induction heating cooking apparatus are disclosed. Some of the disclosed embodiments provide the induction heating cooking apparatus and the method of displaying cooking information of the induction heating cooking apparatus that provide the cooking information to the user using a projector and the reflector positioned inside the induction heating cooking apparatus.

12 Claims, 10 Drawing Sheets

(51) Int. Cl.
*H05B 6/06* (2006.01)
*G03B 21/28* (2006.01)
*G03B 29/00* (2021.01)

(56) References Cited

FOREIGN PATENT DOCUMENTS

| | | | | |
|---|---|---|---|---|
| EP | 2 458 935 A1 | | 5/2012 | |
| EP | 2 876 976 A1 | | 5/2015 | |
| JP | 2003272815 | * | 3/2002 | .............. H05B 6/12 |
| JP | 2003-272815 A | | 9/2003 | |
| JP | 2016-054603 A | | 4/2016 | |
| KR | 10-2003-0074065 A | | 9/2003 | |
| KR | 10-2004-0010099 A | | 1/2004 | |
| KR | 10-2015-0029046 A | | 3/2015 | |
| KR | 10-2015-0060425 A | | 6/2015 | |
| KR | 10-2015-0137802 A | | 12/2015 | |
| WO | WO-2015182914 A1 | * | 12/2015 | .............. F24C 15/10 |

OTHER PUBLICATIONS

Korean Office Action with English translation dated Dec. 17, 2020; Korean Appln. No. 10-2017-0036575.
European Search Report dated Sep. 30, 2019, issued in European Application No. 17870983.8.

* cited by examiner

INDUCTION HEATING COOKING APPARATUS AND METHOD OF DISPLAYING COOKING INFORMATION THEREOF

TECHNICAL FIELD

The following embodiments relate to an induction heating cooking apparatus and a method of displaying cooking information of the induction heating cooking apparatus, and more particularly, to an induction heating cooking apparatus for providing cooking information to a user using a reflector positioned inside the induction heating cooking apparatus, and a method of displaying cooking information of the induction heating cooking apparatus.

BACKGROUND ART

An induction heating cooking apparatus is an electronic device for heating and cooking food using induction heating. Induction heating is a method of converting electrical energy into heat energy by electromagnetic induction and heating the food.

A coil (or working coil) that generates a magnetic field by a current applied below a metal cooking container (e.g., pot, etc.) may be positioned. A secondary current is induced in the metal cooking container by the magnetic field generated in the coil. The induced secondary current causes food ingredients to be heated and cooked using Joule's heat generated in the metal cooking container.

The induction heating cooking apparatus may be more rapidly heated and reduce the generation of harmful gases as compared with a cooking apparatus for heating a cooking container (or metal cooking container) using combustion heat of a fossil fuel.

DISCLOSURE

Technical Problem

Therefore, it is an aspect of the disclosure to provide an induction heating cooking apparatus capable of recognizing cooking information provided from below a top plate through a projector and a reflector inside a main body on the top plate by a user, and a method of displaying cooking information of the induction heating cooking apparatus.

Technical Solution

One aspect of the disclosure provides an induction heating cooking apparatus including: a top plate positioned above a main body, on which a cooking container is placed; a working coil positioned below the top plate, and configured to generate a magnetic field for induction heating the cooking container; a projector positioned in front of the working coil, and configured to output cooking information; and a reflector positioned between the working coil and the projector, and configured to receive the cooking information.

Another aspect of the disclosure provides an induction heating cooking apparatus including: a top plate positioned above a main body, on which a cooking container is placed; a control panel including a display area, and configured to receive a user input; a working coil positioned below the top plate, and configured to generate a magnetic field for induction heating the cooking container; a projector positioned in front of the working coil, and configured to output cooking information; and a reflector positioned between the working coil and the projector, and configured to receive the cooking information. Wherein information displayed on the display area of the control panel and information output on the reflector are different from each other.

Another aspect of the disclosure provides a method of displaying cooking information of an induction heating cooking apparatus, including: receiving from a control panel a user input corresponding to heating of a cooking container placed on a top plate; generating a magnetic field in a working coil positioned below the top plate and induction heating the cooking container corresponding to the user input; displaying first cooking information corresponding to the user input on a display of the control panel; and outputting second cooking information corresponding to the user input from a projector to a reflector positioned between the working coil and the projector.

Advantageous Effects

There are provided an induction heating cooking apparatus and a method of displaying cooking information of the induction heating cooking apparatus that allows a user to recognize a top plate on which cooking information is provided from the direction below the top plate through a projector and a reflector inside a main body.

There are provided an induction heating cooking apparatus and a method of displaying cooking information of the induction heating cooking apparatus that reflects cooking information from below a main body toward the direction of a top plate using a projector and a reflector inside the main body.

There are provided an induction heating cooking apparatus and a method of displaying cooking information of the induction heating cooking apparatus that provides cooking information reflected from below a main body toward the direction of a top plate using a projector and a reflector inside the main body to a user.

There are provided an induction heating cooking apparatus and a method of displaying cooking information of the induction heating cooking apparatus that provides cooking information projected from below a main body toward a top plate using a projector and a projection plate inside the main body to a user.

There are provided an induction heating cooking apparatus and a method of displaying cooking information of the induction heating cooking apparatus that provides cooking information to be image-formed below a main body using a projector and an image formation plate inside the main body to a user.

An induction heating cooking apparatus and a method of displaying cooking information of the induction heating cooking apparatus may be provided in which information provided from the direction below a top plate through a projector inside a main body and information displayed on a display area of a control panel are different.

There are provided an induction heating cooking apparatus and a method of displaying cooking information of the induction heating cooking apparatus that provides information provided from the direction below a top plate through a projector inside a main body and information displayed on a display area of a control panel, respectively.

According to various embodiments of the disclosure, there are provided an induction heating cooking apparatus and a method of displaying cooking information of the induction heating cooking apparatus that allows a user to recognize on a top plate on which cooking information is provided from the direction below the top plate through a projector and a reflector.

MODE OF THE INVENTION

Figure 1A:
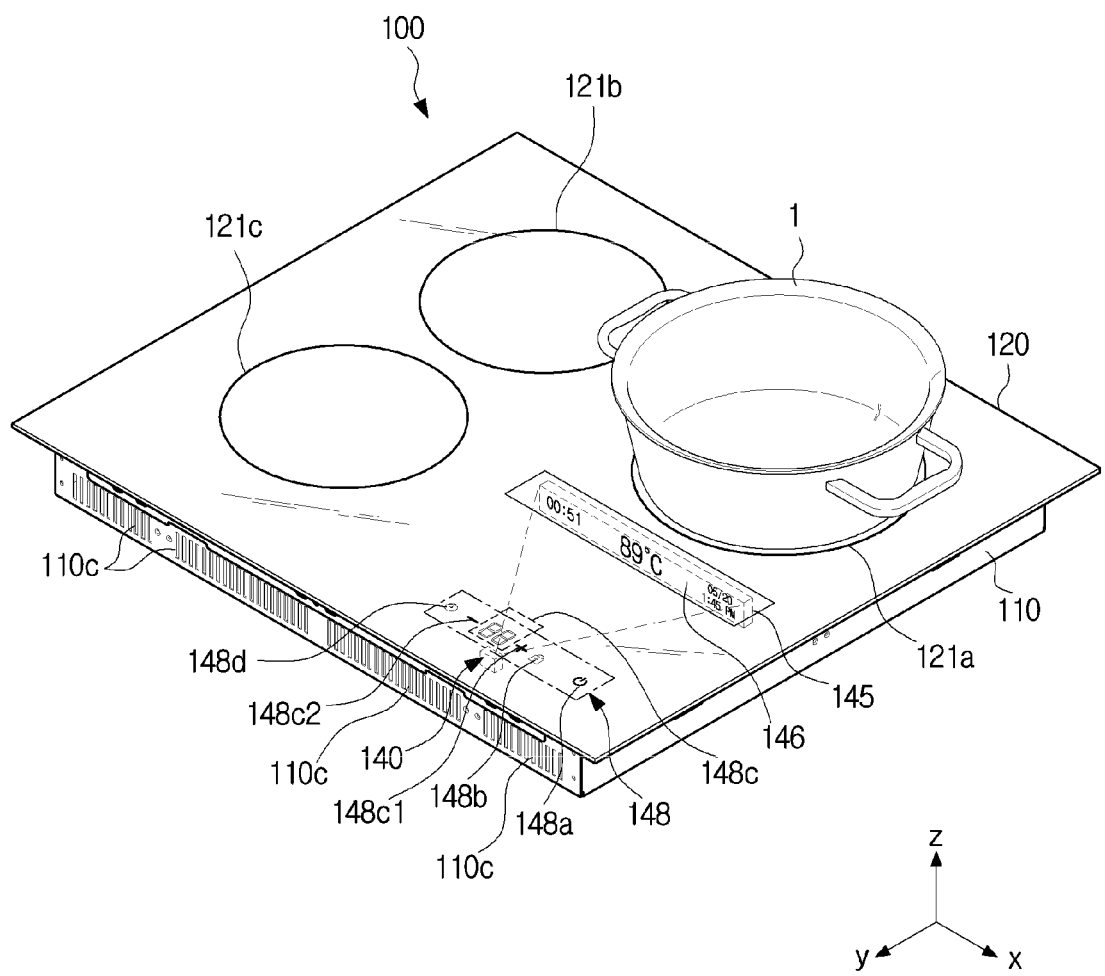
FIGS. 1A and 1B are schematic perspective views illustrating an induction heating cooking apparatus according to an embodiment.

Hereinafter, exemplary embodiments will be described in detail with reference to the accompanying drawings. Also, like reference numerals or symbols denoted in the drawings represent members or components that perform substantially the same functions.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the disclosure. As used herein, the term "and/or" includes any and all combinations of one or more of associated listed items.

The terms used in the disclosure are used to describe the exemplary embodiments. Accordingly, it should be apparent to those skilled in the art that the following description of exemplary embodiments is provided for illustrative purposes only and not for the purpose of limiting the appended claims and their equivalents. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

Like reference numerals in the drawings denote members performing substantially the same function. Hereinafter, the exemplary embodiments of the disclosure will be described in detail with reference to the accompanying drawings.

Figure 1B:
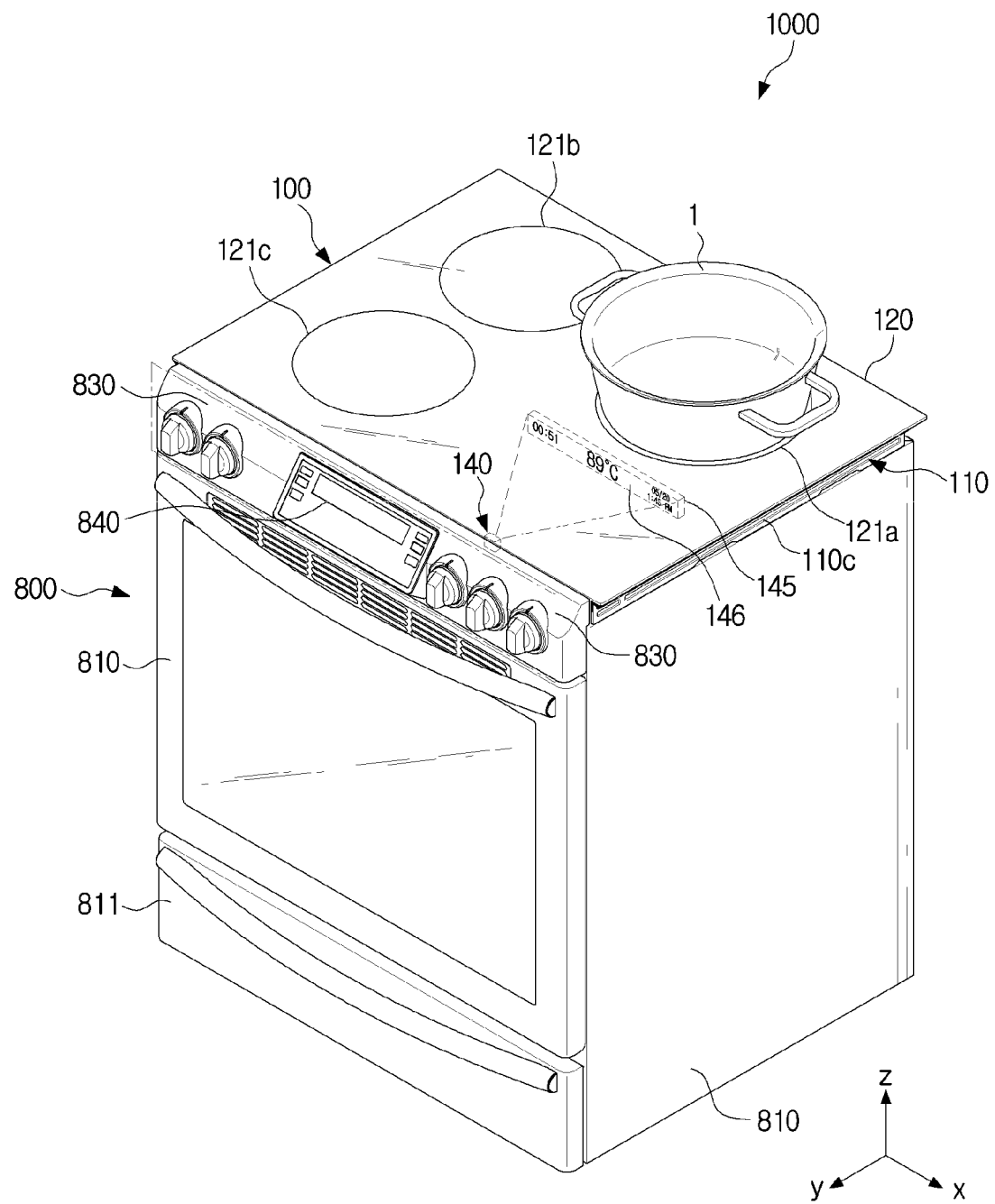

FIGS. 1A and 1B are schematic perspective views illustrating an induction heating cooking apparatus according to an embodiment.

Referring to FIGS. 1A and 1B, an induction heating cooking apparatus 100 may be implemented as a standalone (see FIG. 1A) or with an oven range 1000 built-in (see FIG. 1B) as the induction heating cooking apparatus 100 at the upper end and an oven 800 at the lower end.

The induction heating cooking apparatus 100 may include a main body 110 forming an exterior, a top plate 120, which is positioned on the main body 110 and is a heat-resistant material that supports a cooking container 1 placed over a heating area guide 121 (121a to 121c), a working coil 130 (see FIG. 2) for generating a magnetic field for induction heating the cooking container 1, and a projector 140 for outputting (or projecting, image-forming) cooking information 146 (or operating state information) to a reflector 145 (projection plate, or image formation plate such as a screen). Other components positioned within the main body 110 are described below.

The food material contained in the cooking container 1 may be cooked by induction heating by the magnetic field generated by the working coil 130. The cooking information 146 of the induction heating cooking apparatus 100 including a temperature of the cooking container 1, a cooking elapsed time and/or a date/time may be output to the reflector 145 spaced apart from the projector 140 in the optical axis direction. The user may identify the cooking information 146 of the induction heating cooking apparatus 100 reflected (or projected, image-formed, displayed) from the reflector 145 through the top plate 120. Further, the user may also identify the cooking information 146 of the induction heating cooking apparatus 100 reflected (or displayed) in the reflector 145 through a clearance area 120a (for example, area in which operating state information (or cooking information) can be confirmed, see FIG. 3). The induction heating cooking apparatus 100 may also display weather information (e.g., temperature, humidity, rain, wind, snow, sunlight, etc.), SMS, SNS, e-mail, and alarm (notification, etc.) received from the outside.

In the embodiment of the disclosure, the display of the cooking information of the induction heating cooking apparatus 100 reflected (or projected, image-formed, displayed) from the reflector 145 may include display of only cooking information, partial display of the cooking information and the operating state information, and display of the cooking information and the operating state information.

The operation and/or function of the induction heating cooking apparatus 100 may be controlled (or operated) using a control panel 148 of the induction heating cooking apparatus 100 corresponding to the user's top plate 120 touch (or non-contact including hovering). The user may control (or operate) the operation and/or function of the induction heating cooking apparatus 100 using the control panel 148 of the induction heating cooking apparatus 100 positioned below the top plate 120.

Referring to FIG. 1B, the oven range 1000 may integrally include the oven 800 positioned below and the induction heating cooking apparatus 100 positioned above the oven 800.

The oven 800 may generate high-temperature heat using gas or electricity and may cook food inside a cavity by the convection of air. Doors 811 and 812 positioned on a front surface of a main body 810 of the oven range 1000 may be rotated based on a hinge axis (not shown). An operator 830 and a display 840 for controlling (or inputting) the operation and/or function of the oven 800 may be positioned above the doors 811 and 812.

Similar to FIG. 1A, the cooking information 146 (or operating state information) of the induction heating cooking apparatus 100 including the temperature of the cooking container 1, the cooking elapsed time and/or the date/time may be output to the reflector 145 spaced apart from the projector 140 in the optical axis direction. The user may identify the cooking information 146 of the induction heating cooking apparatus 100 reflected (or displayed) in the reflector 145 through a transparent area (for example, area in which cooking information can be confirmed).

The control panel 148 of the induction heating cooking apparatus 100 may correspond to the operator 830 and the display 840 in the oven range 1000. The induction heating cooking apparatus 100 of the oven range 1000 may include the projector 140 and the reflector 145 except for the operator 830 and the display 840.

Figure 2:
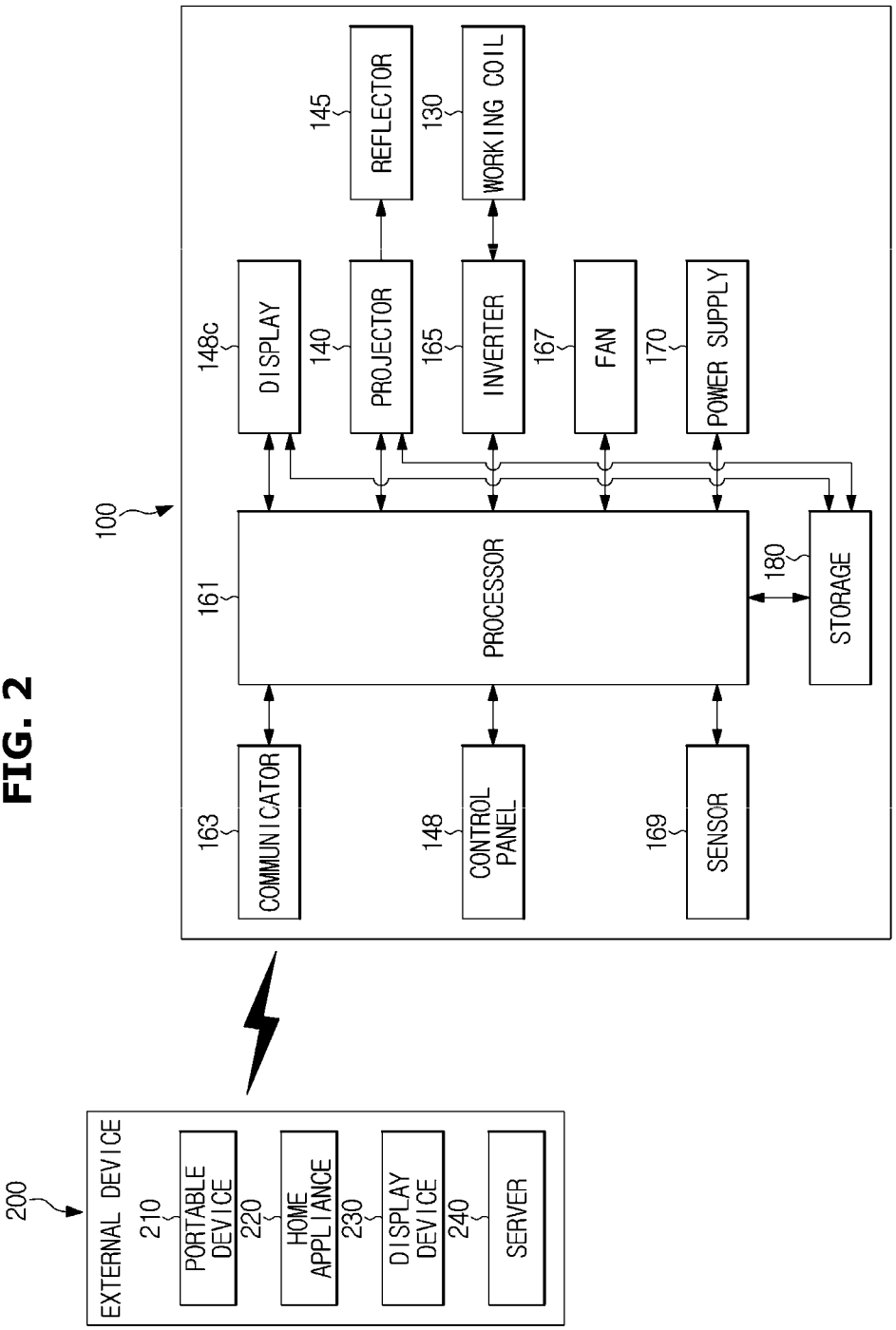
FIG. 2 is a schematic block diagram illustrating the induction heating cooking apparatus according to an embodiment.

FIG. 2 is a schematic block diagram illustrating the induction heating cooking apparatus according to an embodiment.

Referring to FIG. 2, the induction heating cooking apparatus 100 may be operatively connected to an external device 200 using a communicator 163. The external device 200 may include a portable device 210 including a smart phone, a home appliance 220 including a refrigerator, a display device 230 including a TV, or a server 240.

The induction heating cooking apparatus 100 may transmit operation information (e.g., cooking course or option) of the induction heating cooking apparatus 100 or state information (e.g., normal, abnormal, etc.) of the induction heating cooking apparatus 100 to the external device 200 through the communicator 163, or may receive control information (for example, a control command corresponding to power on/off of the induction heating cooking apparatus, etc.) from the outside.

The induction heating cooking apparatus 100 includes a processor 161, the working coil 130, the projector 140, the control panel 148, a display 148c, the communicator 163, an inverter 165, a fan 167, a power supply 170, and a storage 180. The induction heating cooking apparatus 100 may include the reflector 145. The induction heating cooking apparatus 100 may further include a sensor 169 (e.g., a temperature sensor (not shown) or an overheat sensor (not shown), etc.).

The processor 161 may control the operation of the induction heating cooking apparatus 100. The processor 161 may include a non-volatile memory (for example, flash memory and Read Only Memory (ROM)) in which a control program for controlling the induction heating cooking apparatus 100 is stored, and a volatile memory (for example, Random Access Memory (RANI)) used as a storage area for the control information received from the outside of the induction heating cooking apparatus 100, the operating state information of the induction heating cooking apparatus 100, or the state information of the induction heating cooking apparatus 100.

The processor 161 may control the operation of the projector 140 (for example, power on/off, operation, stop, etc.). For example, the processor 161 may output an electrical signal corresponding to the output of the cooking information to the projector 140. The processor 161 may control the operation of the inverter 165 (for example, power on/off, operation, stop, etc.). For example, the processor 161 may output the electrical signal corresponding to the induction heating of the cooking container 1 to the inverter 165.

The processor 161 may control the operation of the induction heating cooking apparatus 100 and the signal flow between the internal components 130 to 180 and may process the data. The processor 161 may collect operating state information of the induction heating cooking apparatus 100 and may detect the state of the induction heating cooking apparatus 100 using the sensor 169. The processor 161 may use the power supply 170 to control the power supply to the internal components 130 to 180.

The processor 161, the non-volatile memory (not shown), and the volatile memory (not shown) may be interconnected. Any of the processor 161, the non-volatile memory (not shown), and the volatile memory (not shown) may be implemented in a built-in or system on chip (SOC) form.

The processor 161 may control the projector 140, the control panel 148, the display 148c, the communicator 163, the inverter 165, the fan 167, the power supply 170, and the storage 180. In addition, the processor 161 may control the sensor 169.

The processor 161 may refer to a controller of the induction heating cooking apparatus 100. The processor 161, the non-volatile memory, and the volatile memory may be referred to as the controller of the induction heating cooking apparatus 100.

The working coil 130 may induction heat the cooking container 1 placed on the top plate 120 under the control of the processor 161. The working coil 130 may induction heat the cooking container 1 placed on the top plate 120 in response to a user input received through the control panel 148. A detailed description of the working coil 130 will be described later with reference to FIG. 3

The projector 140 may output (or project, image, etc.) the cooking information (including operating state information) of the induction heating cooking apparatus 100 to the reflector 145 under the control of the processor 161. The projector 140 may include a small projector (or a Pico projector). The small projector may include a light source (for example, light emitting diode (LED), LASER, etc.), an image panel (for example, digital mirror device (DMD), liquid crystal display (LCD), liquid crystal on silicon (LCoS), etc.), one or a plurality of lenses, one or a plurality of mirrors, and one or a plurality of filters. Also, the projector 140 may be mounted on a projection board 141 and a microcontroller (not shown) that controls the projector 140, respectively. The above-described components of the projector are only one example, and some of the components may be changed, added, and deleted.

The operating state information of the induction heating cooking apparatus 100 may include, for example, power on/off, start of cooking, cooking in progress, completion of cooking, or whether an error has occurred. The cooking information of the induction heating cooking apparatus 100 may include, for example, cooking time (total cooking time, remaining cooking time, or cooking elapsed time), cooking temperature (cooking container surface temperature, working coil surface temperature, etc.), and error information (overheating, overcooking, maximum cooking temperature, control panel error, fan error, etc.). The projector 140 may receive non-cooking information, for example, weather information (e.g., temperature, humidity, rain, wind, snow, sunlight, etc.), SMS, SNS, and alarm (notification, etc.) received from the external devices 210 to 240 through the communicator 163 under the control of the processor 161 to the reflector 145.

In the embodiment of the disclosure, the non-cooking information may refer to information other than the cooking information displayed in the induction heating cooking apparatus 100. In addition, the non-cooking information may be information other than the cooking information displayed in the induction heating cooking apparatus 100, and may be either received from the outside (or external device) and stored in the storage 180.

The operating state information of the induction heating cooking apparatus 100 may include one or a plurality of texts, one or a plurality of images, one or a plurality of symbols, or one or a plurality of moving images. The operating state information of the induction heating cooking apparatus 100 may include a combination of text, images, symbols, and moving images. Further, the cooking information of the induction heating cooking apparatus 100 may include one or a plurality of texts, one or a plurality of images, one or a plurality of symbols, or one or a plurality of moving images. The cooking information of the induction heating cooking apparatus 100 may include a combination of text, images, symbols, and moving images.

A color of the cooking information (including operating state information) of the induction heating cooking apparatus 100 may be in color or achromatic. The color of the cooking information (including operating state information) of the induction heating cooking apparatus 100 may be determined in order to improve the visibility of the user. The projector 140 may output at least one of the cooking information (including operating state information) of the induction heating cooking apparatus 100 which is in color or achromatic determined according to the control of the processor 161 (or control of the processor and control of the microcontroller that controls the projector).

The projector 140 may selectively control the operating state information and the cooking information of the induction heating cooking apparatus 100 according to the control of the processor 161 (or control of the processor and control of the microcontroller that controls the projector) to the reflector 145. The selective output of the operating state information and the cooking information of the induction heating cooking apparatus 100 may include sequentially outputting in priority to one of the operating state information and the cooking information of the induction heating cooking apparatus 100, or outputting the operating state information and the cooking information of the induction heating cooking apparatus 100 together.

In the embodiment of the disclosure, the cooking information of the induction heating cooking apparatus 100 may include the operating state information of the induction heating cooking apparatus 100. For example, the cooking information of the induction heating cooking apparatus 100 may include at least one of the cooking information of the induction heating cooking apparatus 100 and the operating state information of the induction heating cooking apparatus 100.

The cooking information (including operating state information) of the induction heating cooking apparatus 100 output from the projector 140 to the reflector 145 may be stored in the storage 180 or received (including streaming) from the outside through the communicator 163.

The control panel 148 may receive the user input. The user may input (or select, or touch) a power on/off button 148a of the induction heating cooking apparatus 100, a control panel lock button 148b, increment/decrement buttons 148c1 and 148c2, and a timer button 148d through the control panel 148.

The control panel 148 may display information corresponding to the received user input under the control of the processor 161. The user's input may be displayed through the display 148c of the control panel 148.

The area of the display 148c may be changed according to the function and structure of the induction heating cooking apparatus 100.

The control panel 148 includes a burner selection switch (not shown), a dial switch (or magnetic knob, not shown), and a thermal switch (not shown) for selecting one of the plurality of burners. The buttons of the control panel 148 described above are only one example and may be changed corresponding to the number of burners (e.g., one to two or more) of the induction heating cooking apparatus 100 and heating methods (e.g., induction heating, radiant heating, and the like).

The control panel 148 is capable of input (or receiving) and output, while the projector 140 is only capable of output (or reflect, project, image). The control panel 148 may receive and display the user input. The projector 140 may output (or reflect, project, or image) the cooking information.

The information (or some of the cooking information) displayed on the control panel 148 may be different from the information (or the cooking information) output from the projector 140. The cooking information output from the display 148c (or display area), which is an output area of the control panel 148, and the cooking information output from the projector 140 may be different. The cooking information output to the control panel 148 and the projector 140 may be different from each other.

The communicator 163 may be connected to the external device 200 (210 to 240) or a network through a communication network using one or more antennas under the control of the processor 161. The communicator 163 may transmit the operation information (for example, washing course or option, etc.) of the induction heating cooking apparatus or the state information (for example, normal, abnormal, etc.) of the induction heating cooking apparatus under the control of the processor 161 to the outside. Also, the communicator 163 may receive control information (for example, control command corresponding to power on/off of the induction heating cooking apparatus) from the outside under the control of the processor 161.

The communicator 163 may include a wireless LAN communicator, a local communicator, or a mobile communicator. The WLAN communicator may support, for example, Wi-Fi communication. The local communicator may include, for example, Bluetooth communication, Bluetooth low energy communication, infrared data association (IrDA) communication, ultra-wideband (UWB) communication, and/or NFC communication. The mobile communicator may be connected to the external device 200 through a mobile communication network using one or more antennas under the control of the processor 161.

The communicator 163 may receive the non-cooking information, for example, the weather information (e.g., temperature, humidity, rain, wind, snow, sunlight, etc.), SMS, SNS, and alarm (notification, etc.).

The power supply 170 may convert input AC power into DC power. For example, the power supply 170 may supply an AC power source (AC 220 V to 240 V, $50/60$ Hz) as a DC power source (VDC 3.3 V, 5.0 V, 12 V, or 15 V). The power supply 170 may convert the AC power to DC power under the control of the control processor 161 corresponding to the inputs of the increment/decrement buttons 148c1 and 148c2 of the control panel 148.

The inverter 165 may convert the converted DC power to AC power (for example, from a low voltage to a high voltage). A high-frequency alternating current may be applied to the working coil 130 through the inverter 165. The inverter 165 may change a high-frequency current applied to the working coil 130 under the control of the processor of the control board 160. The inverter 165 may change the high-frequency current applied to the working coil 130 under the control of the processor 161.

The fan 167 may cool the heat inside the main body 110 under the control of the processor 161. The fan 167 positioned below a cooling unit 166 may circulate hot air inside the main body 110 and may discharge the air through an opening (not shown) of a bottom surface 110b. In addition, the fan 167 may suck outside air into the main body 110 to cool (or circulate) the hot air and may discharge the hot air to the outside through the opening (not shown) of a lateral surface.

The rotation speed of the fan 167 may be changed under the control of the processor 161.

The sensor 169 may detect the operation and/or the state of the induction heating cooking apparatus 100. The sensor 169 may output an electrical signal corresponding to the operation and/or state of the detected induction heating cooking apparatus 100 to the processor 161.

A temperature sensor (not shown) may detect the internal temperature of the main body 110. An overheat sensor (not shown) may detect whether the working coil 130 is overheated.

The storage 180 may store signals or data input/output corresponding to the operation (or state) of the components 130 to 180 under the control of the processor 161. The storage 180 may store a control program for controlling the induction heating cooking apparatus 100 or the processor 161. The storage 180 may include the control information received from the external device 200, the information corresponding to the electrical signal received by the user input from the control panel 148, the information corresponding to the electrical signal received from the sensor 169, the operating state information of the induction heating cooking apparatus 100, or the state information of the induction heating cooking apparatus 100.

It will be readily understood by those skilled in the art that the components of the induction heating cooking apparatus 100 illustrated in FIG. 2 can be added, deleted, or changed by at least one of components in accordance with the performance of the induction heating cooking apparatus 100.

Figure 3:
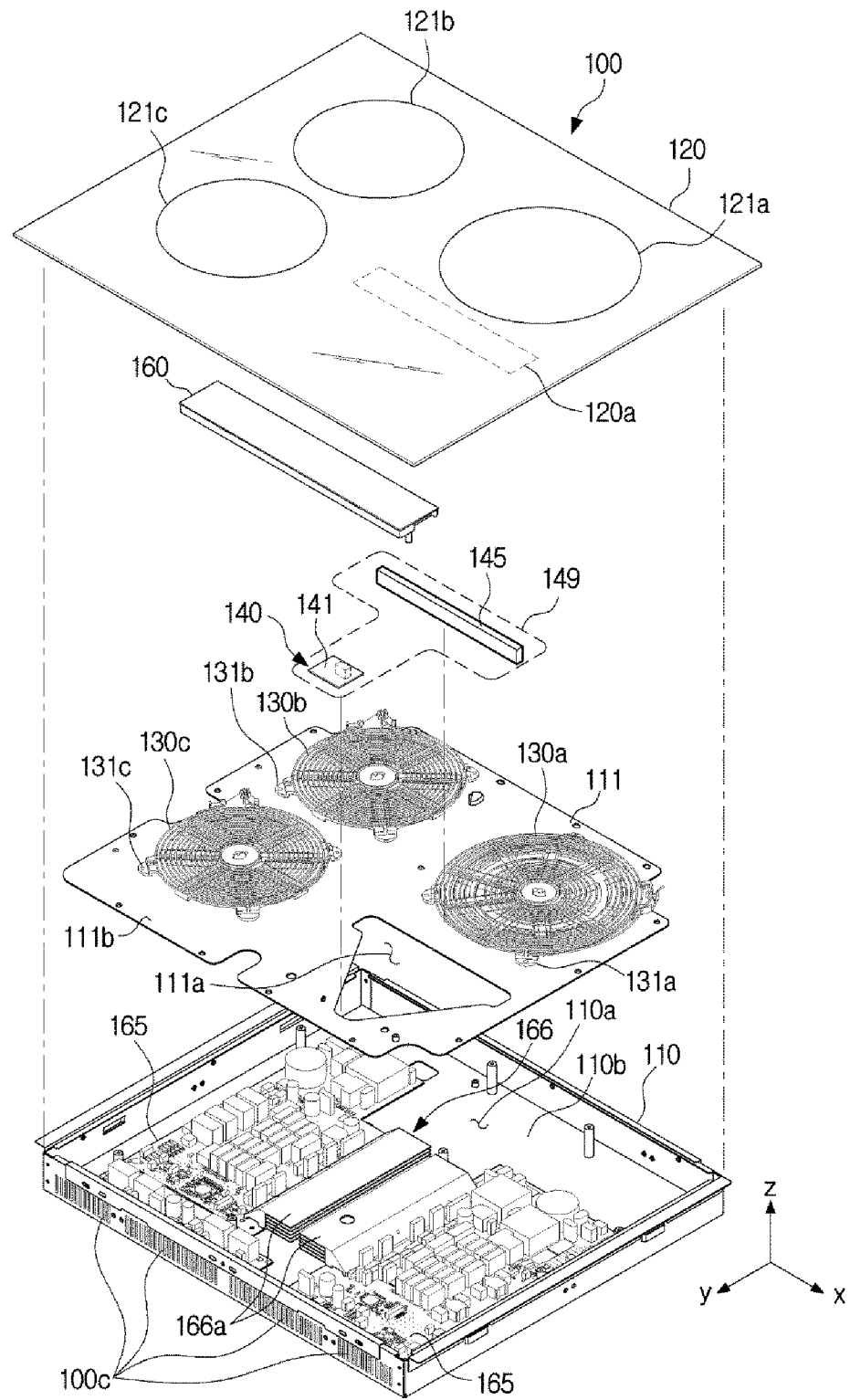
FIG. 3 is a schematic exploded perspective view illustrating the induction heating cooking apparatus according to an embodiment.

FIG. 3 is a schematic exploded perspective view illustrating the induction heating cooking apparatus according to an embodiment.

Referring to FIGS. 1A to 3, the induction heating cooking apparatus 100 may include the main body 110 and the top plate 120. The main body 110 may include a plurality of the working coils 130, the projector 140, the reflector 145, the control board 160 including the processor 161, the inverter 165, the cooling unit 166, the fan 167, and the power supply 170 (SPMS). The induction heating cooking apparatus 100 may further include the communicator 163 and the storage 180 that are positioned inside the main body 110 (or mounted on the control board).

At least one surface (for example, one surface of a plurality of surfaces including one surface or another surface) of a polyhedron in the main body 110 of the induction heating cooking apparatus 100 may be opened. At least one surface of the polyhedron that is opened in the main body 110 may be an upper surface. At least one surface of the polyhedron that is opened in the main body 110 may be one of an upper surface and four lateral surfaces.

The top plate 120 of the heat-resistant material may be positioned on the opened one surface of the main body 110. The material of the top plate 120 may include heat-resistant transparent glass (or heat-resistant transparent tempered glass). The area of the top plate 120 may be greater than the area of the opened one surface (e.g., an opening 110a) of the main body 110 contacting the top plate 120. For example, the area of the top plate 120 may be greater than 95% and less than 150% of the area of the opened one surface of the main body 110 contacting the top plate 120. Also, the area of the top plate 120 may be less than 100% and greater than 80% of the area of the opened one surface of the main body 110 contacting the bottom surface of the top plate 120.

The top plate 120 may be painted in black or other colors (e.g., blue, gray, etc., color that can be changed by a manufacturer). One surface of the top plate 120 (e.g., a bottom surface of the top plate 120 facing the bottom surface 110b of the main body 110) may be painted with black or other colors. Some areas on one surface of the top plate 120 may be painted with black, and areas other than the some areas may be painted with gray. One surface of the top plate 120 may be divided into a plurality of areas, and the divided areas may be painted with various colors.

When the bottom surface of the top plate 120 is painted in black or another color, the user may recognize (or identify) the cooking information (including operating state information) of the induction heating cooking apparatus 100 reflected (or projected, image-formed, etc.) from the reflector 145. However, due to the painting of the top plate 120, the components positioned inside the main body 110 of the induction heating cooking apparatus 100 may not be distinguished from the outside. Also, the top plate 120 may be partially painted in black.

Some areas (e.g., the clearance area 120a) of the bottom surface of the top plate 120 may be transparent (e.g., not painted black). The user may recognize the cooking information (including operating state information) reflected (or projected, image-formed, etc.) from the reflector 145 through the clearance area 120a. The clearance area 120a may be implemented in a position that enhances the visibility of the cooking information (including operating state information) reflected (or projected, image-formed, etc.) from the reflector 145.

The main body 110 may have the opening 110a and the bottom surface 110b. The inverter 165, the cooling unit 166, the fan 167 (see FIG. 2), and the power supply 170 (see FIG. 2) may be respectively coupled to the bottom surface 110b.

The processor (or microcontroller) 161 of the control board 160 may control one or the plurality of working coils 130, the projector 140, the control panel 148, the inverter 165, the cooling unit 166, the fan 167, and the power supply 170.

The processor (or microcontroller) 161 of the control board 160 may control some or the plurality of working coils 130, the projector 140, the control panel 148, the inverter 165, the cooling unit 166, the fan 167, and the power supply 170. Another processor (for example, a microcontroller that controls the projector 140, not shown) other than the processor 161 of the control board 160 may also control other components (e.g., the projector 140) not controlled by the processor 161 of the control board 160.

The processor 161 of the control board 160 may output at least one of the operating state information (e.g., power on/off or display of the cooking information, or the like) of the projector 140 or the state information (e.g., normal operation, error occurrence, etc.) of the projector 140 to the projector 140.

The processor of the control board 160 may receive input (or user input) through the buttons 148a to 148d of the control panel 148. The processor of the control board 160 may display the received input result in the display 148c (or display area).

A partition 111, which is a flat plate (or a curved surface having a curvature), is positioned between the bottom surface 110b of the main body 110 and the top plate 120. The partition 111 may be provided with the main body 110 so as to have an interval (for example, 1 to 15 mm or less) without contacting (or interfering with) at least one of the inverter 165, the cooling unit 166, the fan 167, and the power supply 170 positioned on the bottom surface 110b of the main body 110. A thickness of the partition 111 may be thinner than or equal to a thickness of the top plate 120.

The thickness of the partition 111 may be thinner than or equal to a thickness of the bottom surface 110b of the main body 110. A material of the partition 111 may comprise a metal material (e.g., aluminum, copper, etc.) capable of shielding the magnetic field.

The partition 111 may have an opening 111a. The air between the partition 111 and the top plate 120 may be moved in the direction of the bottom surface 110b through the opening 111a. The air between the partition 111 and the top plate 120 may be moved in a fan direction by the fan 167 through the opening 111a of the partition 111.

The working coils 130 (130a to 130c) may be positioned between the bottom surface 111b of the partition 111 and the top plate 120. The working coils 130 may be positioned on pedestals 131 (131a to 131c) that are engaged (or fixed) with the bottom surface 111b of the partition 111. Each of the working coils 130 may be positioned above each of the pedestals 131. The working coil 130 may be positioned on the pedestal 131 radially spreading with respect to the center of the pedestal 131. The shape of the working coil 130 may include a circle, an ellipse, a polygon, or a rectangle with rounded corners. The working coil 130 may be coupled to the inverter 165.

The number of the working coils 130 may be one or more. In the embodiment of the disclosure, three of the working coils 130a to 130c have been described, but the embodiment is not limited thereto. Each of the working coils 130a to 130c may be positioned in a vertex direction with respect to the center of the partition 111. Each of the working coils 130 may be positioned in an edge direction with respect to the center of the partition 111.

A diameter of each of the working coils 130 may be the same as the working coils 130b and 130c or different than the working coils 130a. The diameter of the working coil 130 of at least one of the plurality of working coils 130a to 130c may be different from the diameter of the other working coils 130. The diameter of the working coil 130a adjacent (or closest to) the reflector 145 may be greater than the diameter of the other working coils 130b and 130c.

The projector 140 may output the cooking information (including operating state information) of the induction heating cooking apparatus 100 to the reflector 145.

The number of the projectors 140 may be less than the number of the working coils 130. For example, the number of the projectors 140 may be less than the plurality of working coils 130a to 130c.

The reflector (projection plate or image formation plate) 145 may receive the cooking information (including operating state information) of the induction heating cooking apparatus 100 output from the projector 140. The reception of the cooking information (including operating state information) of the induction heating cooking apparatus 100 in the reflector 145 may include reflection, projection, or image formation of the cooking information (including operating state information) of the induction heating cooking apparatus 100.

The cross-section of the reflector 145 may include a convex lens, a concave lens, an ellipse, a quadrangle, or a quadrangle with rounded corners. The cross-section of the reflector 145 described above is one example, but is not limited thereto.

In the embodiment of the disclosure, the reflector 145 may include a projection plate or an image formation plate. The projector 140 and the reflector 145 may be referred to as a cooking information display 149. A detailed description of the reflector 145 will be described later.

The power supply 170 may convert AC power to DC power.

The inverter 165 may convert the DC power to AC power (for example, from a low voltage to a high voltage).

The cooling unit 166 may cool the heat inside the main body 110. The cooling unit 166 may include at least one of a heat radiating fin 166a and the fan 167.

Figure 4A:
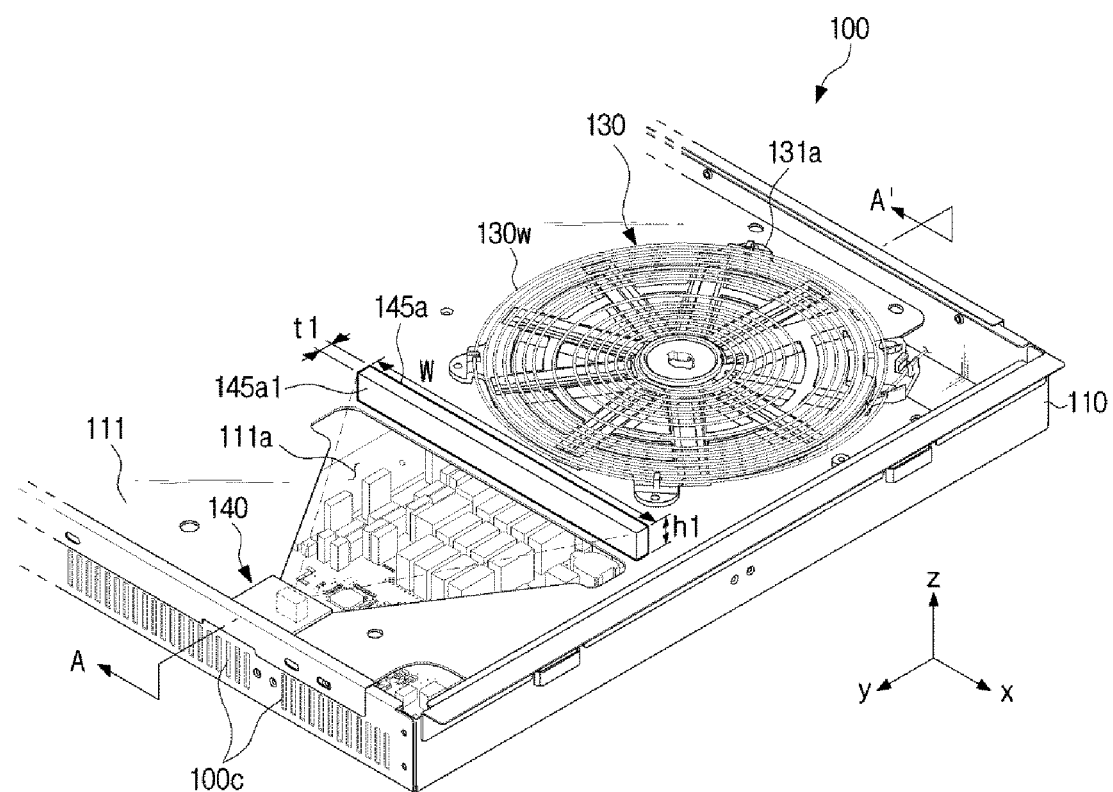
FIGS. 4A and 4B are schematic perspective views illustrating a cooking information display according to an embodiment.
Figure 4B:
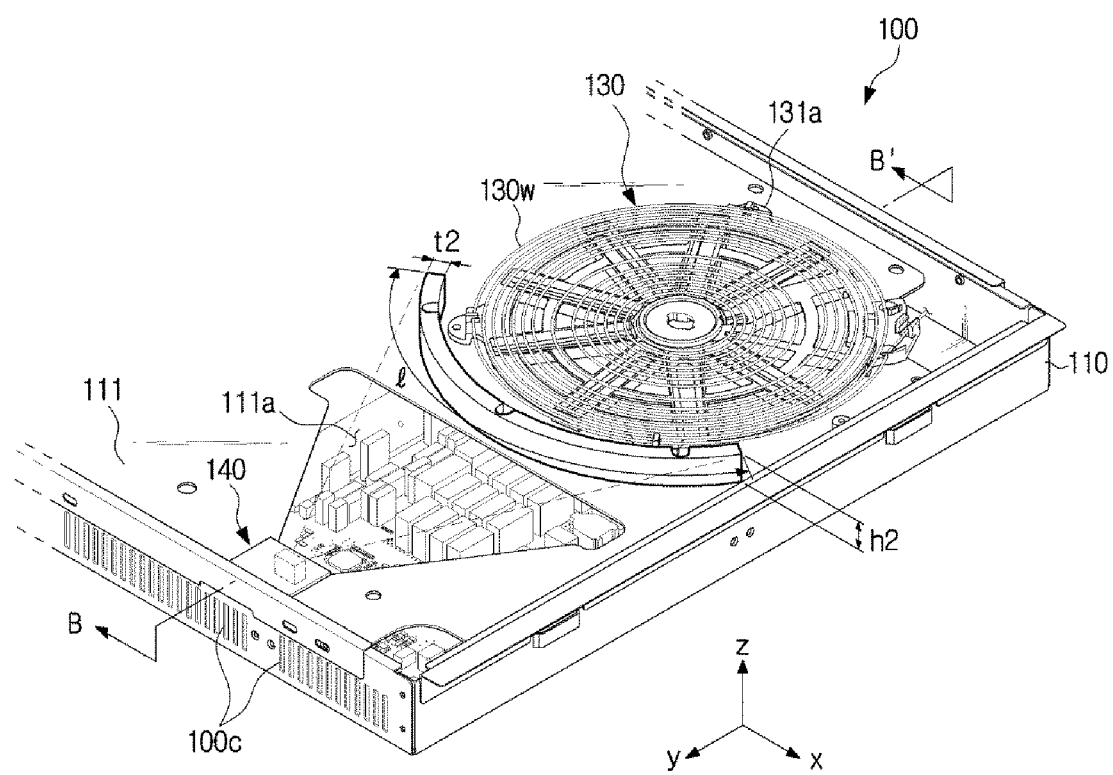

FIGS. 4A and 4B are schematic perspective views illustrating a cooking information display according to an embodiment.

Figure 5A:
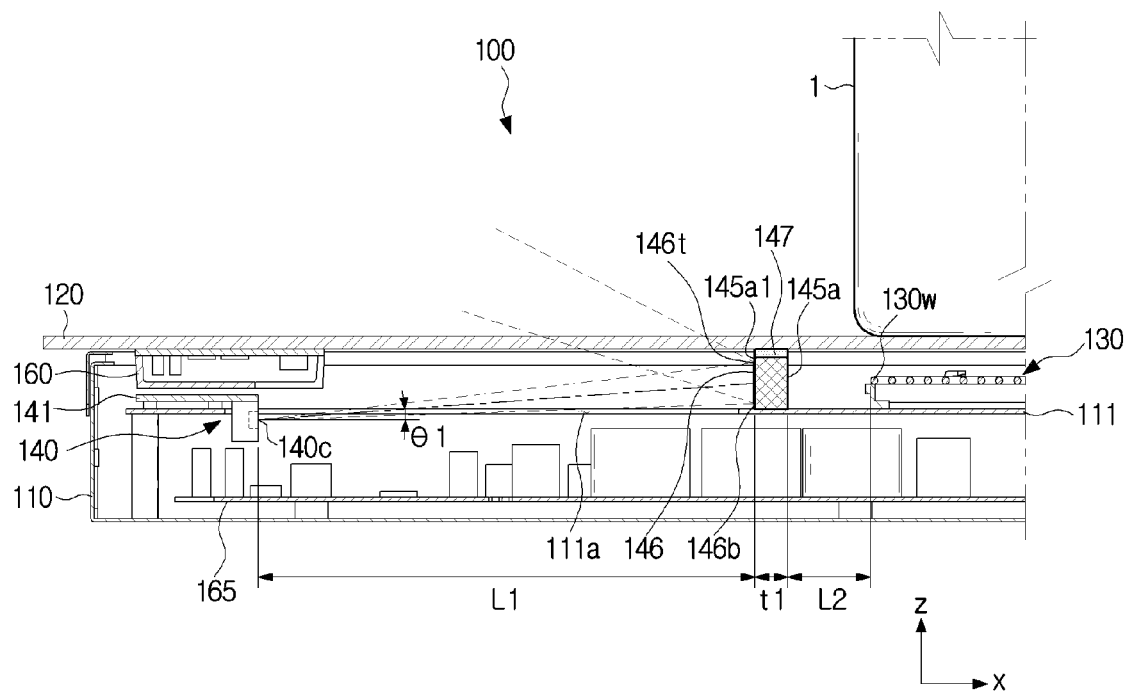
FIGS. 5A and 5B are schematic cross-sectional views illustrating the cooking information display according to an embodiment.
Figure 5B:
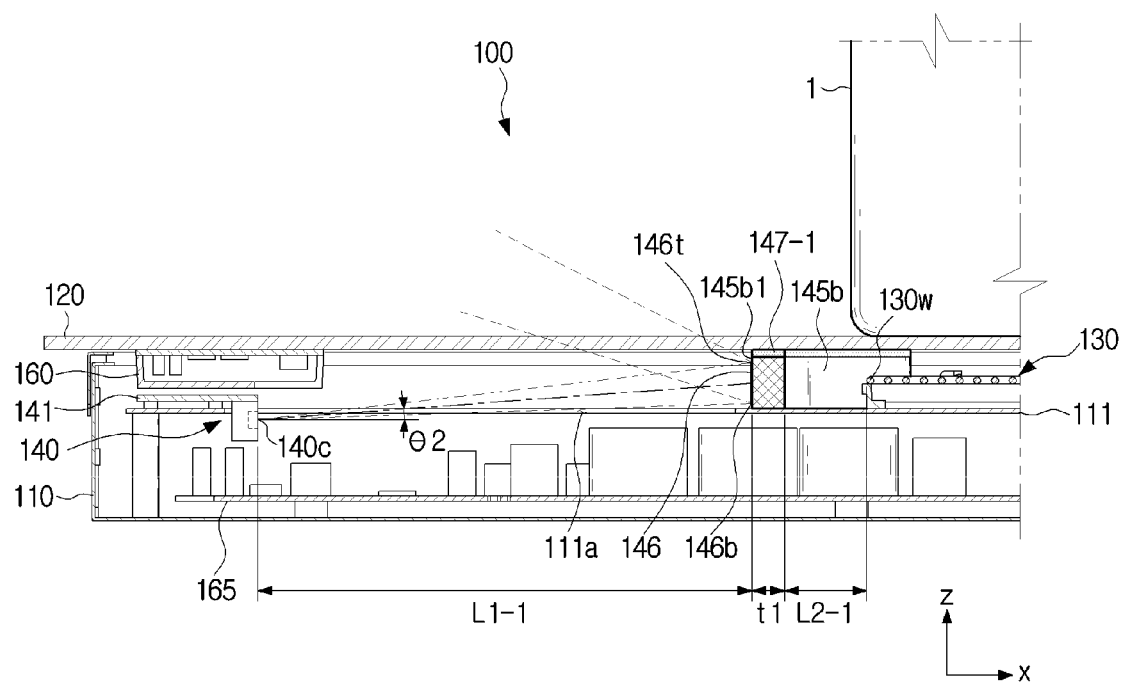

FIGS. 5A and 5B are schematic cross-sectional views illustrating the cooking information display according to an embodiment. FIG. 5A is a cross-sectional view corresponding to a cross-section A-A' of FIG. 4A. FIG. 5B is a cross-sectional view corresponding to a section plane B-B' of FIG. 4B.

Referring to FIGS. 4A to 5B, the cooking information display 149 of the induction heating cooking apparatus 100 is displayed. In FIGS. 4A and 5A, the cooking information display 149 may include the projector 140 and a flat reflector 145a. In FIGS. 4B and 5B, the cooking information display 149 may include the projector 140 and a curved reflector 145b.

In FIGS. 4A and 5A, the flat reflector 145a may be positioned at a distance of a first predetermined distance L1 (e.g., 150 mm, a distance that can be changed by the manufacturer) from the projector 140. The first predetermined distance L1 may correspond to at least one of the size of the projector 140 and the distance between the working coil 130 and the projector 140. Also, the first predetermined distance L1 may be changed depending on the lens performance in the projector 140 or the structure of an optical system.

A part of the projector 140 may be positioned through the opening 111a. The opening 111a may be formed in consideration of the part of the projector 140 passing therethrough.

An angle θ1 may be generated between an optical axis 140c of the projector 140 and the flat reflector 145a because a coupling position of the flat reflector 145a (for example, a coupling position with the control board or a coupling position with the main body) is different from a coupling position of the projector 140. The angle θ1 may be generated between the optical axis 140c of the projector 140 and the flat reflector 145a because the coupling position of the projector 140 coupled with the control board 160 and the flat reflector 145a coupled with the partition 111 are different each other.

The angle θ1 may be generated between the optical axis 140c of the projector 140 and the flat reflector 145a may be 5 degrees or less. The angle θ1 may be generated between the optical axis 140c of the projector 140 and the flat reflector 145a may be greater than 3 degrees and less than 10 degrees. The angle θ1 between the optical axis 140c of the projector 140 and the flat reflector 145a may be expressed as an angle between a highest position 146t (or maximum height) of the cooking information 146 (including operating state information) of the induction heating cooking apparatus 100 reflected (or projected, image-formed, etc.) by the flat reflector 145a or an angle between a lowest position 146*b* (or minimum height) of the cooking information 146 (including operating state information) of the induction heating cooking apparatus 100 reflected (or projected, image-formed, etc.) by the flat reflector 145*a*.

The flat reflector 145*a* is inclined at 90 degrees with respect to the bottom surface 110*b* of the main body 110. The flat reflector 145*a* is greater than 88 degrees and less than 93 degrees with respect to the bottom surface 110*b* of the main body 110.

The flat reflector 145*a* may be spaced apart from an outermost working coil 130*w* of the working coil 130 by a second predetermined distance L2 (for example, 25 mm, a distance that can be changed by the manufacturer). The first predetermined distance L1 is greater than the second predetermined distance L2.

A width w of the flat reflector 145*a* may be changed according to the diameter of the working coil 130. For example, when the diameter of the working coil 130 is 240 mm, the width w of the flat reflector 145*a* may be 240 mm or less than 240 mm. When the diameter of the working coil 130 is 180 mm, the width of the flat reflector 145*a* may be less than 180 mm or 180 mm. Also, the width w of the flat reflector 145*a* may be greater than the diameter of the working coil 130.

The width w of the flat reflector 145*a* may be greater than the width of the cooking information 146 (including operating state information) of the induction heating cooking apparatus 100 output from the projector 140. For example, when the cooking information (including operating state information) of the induction heating cooking apparatus 100 is 200 mm, the width w of the flat reflector 145*a* may be greater than 200 mm.

A height h1 of the flat reflector 145*a* may be changed according to the height of the inverter 165 below the partition 111. For example, the height h1 of the flat reflector 145*a* may be less than 15 mm or 15 mm. A thickness t1 of the flat reflector 145*a* may be less than the height h1 of the flat reflector 145*a*. For example, the thickness t1 of the flat reflector 145*a* may be 10 mm or less. In addition, the thickness t1 of the flat reflector 145*a* may be less than 15 mm.

The material of the flat reflector 145*a* may be a heat-resistant material because it is positioned adjacent to the cooking container 1 heated to a high temperature. The material of the flat reflector 145*a* may include, for example, aluminum, stainless steel without iron, heat-resistant injection plastic, heat-resistant silicone or heat-resistant rubber. Heat-resistant injection plastics may include polycarbonate, polyamide, polyphenylene sulfide, or the like. The material of the flat reflector 145*a* is merely an example, and the heat-resistant material is sufficient. The surface (e.g., facing the projector) of the flat reflector 145*a* may be coated with a reflective coating (e.g., silver or TiO2) of white, silver, or achromatic color. In addition, the surface of the flat reflector 145*a* may be adhered to the same coating or film as the surface material of a roll screen.

The cooking information (including operating state information) of the induction heating cooking apparatus 100 may be reflected at a front surface 145*a*1 of the flat reflector 145*a*. The front surface 145*a*1 of the flat reflector 145*a* may be treated with a film (not shown) or coated (not shown) to improve the visibility of the cooking information (including operating state information) of the induction heating cooking apparatus 100. Also, the cooking information (including operating state information) of the induction heating cooking apparatus 100 may be projected or image-formed from the front surface 145*a*1 of the flat reflector 145*a*.

An anti-shock material 147 may be positioned between the flat reflector 145*a* and the top plate 120. The anti-shock material 147 may be adhered (or attached, coupled) to at least one of the flat reflector 145*a* and the top plate 120. The thickness of the anti-shock material 147 may be 2 to 3 mm. Further, the thickness of the anti-shock material 147 may be 5 mm or less. The material of the anti-shock material 147 may include heat-resistant silicone, rubber, sponge, or the like.

In another embodiment of the disclosure, the induction heating cooking apparatus 100 may further include a virtual flame generator (e.g., a plurality of light sources, a plurality of lenses corresponding to the plurality of light sources, and a light source and lens holder, etc.) adjacent to the working coil 130 (e.g., between the working coil 130 and the reflector 145) to cause a virtual flame to be displayed on the surface of the cooking container 1.

All or a part of the plurality of light sources can be controlled. The part of the plurality of light sources may include an individual light source of the total light sources or a group light source (which is less than 75% of the total light source) that is a collection of individual light sources.

The virtual flame output from the virtual flame generator may be transmitted through the top plate 120 of the heat-resistant material painted in black, or may pass through a separate clearance area (not shown) implemented in correspondence with the virtual flame generator to the top plate 120 of the heat-resistant material painted in black.

The virtual flame described above may be changed by the user depending on the input of the increment/decrement buttons 148*c*1 and 148*c*2 of the control panel 148, such as the size, color, brightness, or lighting speed of the virtual flame. The virtual flame may be changed in brightness and blinking degree similar to an actual flame.

In FIGS. 4B and 5B, the curved reflector 145*b* may be positioned at a distance of a first predetermined distance L1-1 (e.g., 150 mm, a distance that can be changed by the manufacturer) from the projector 140.

The first predetermined distance L1-1 in FIGS. 4B and 5B is substantially similar to the first predetermined distance L1 in FIGS. 4A and 5A (for example, difference in reflector), thus redundant description is omitted. The openings 111*a* in FIGS. 4B and 5B are substantially similar to the opening 111*a* in FIGS. 4A and 5A (for example, difference in reflector), thus redundant description is omitted.

An angle $\theta 2$ may be generated between the optical axis 140*c* of the projector 140 and the flat reflector 145*b* in FIGS. 4B and 5B corresponds to the angle $\theta 1$ may be generated between the optical axis 140*c* of the projector 140 and the flat reflector 145*a* in FIGS. 4A and 5A (for example, difference in reflector), thus redundant description is omitted.

The curved reflector 145*b* may be spaced apart from the outermost working coil 130*w* of the working coil 130 by a second predetermined distance L2-1 (for example, 25 mm, a distance that can be changed by the manufacturer). The first predetermined distance L1-1 is greater than the second predetermined distance L2-1.

An arc/of the curved reflector 145*b* may be changed according to the diameter of the working coil 130. For example, when the diameter of the working coil 130 is 240 mm, the arc/of the curved reflector 145*b* may be 240 mm or greater than 240 mm. When the diameter of the working coil 130 is 180 mm, the arc/of the curved reflector 145*b* may be greater than 180 mm or 180 mm. Also, the arc/of the curved reflector 145*b* may be less than the diameter of the working coil 130.

The arc/of the curved reflector 145b may be greater than a width of the cooking information 146 (including operating state information) of the induction heating cooking apparatus 100 output from the projector 140. For example, when the cooking information (including operating state information) of the induction heating cooking apparatus 100 is 200 mm, the arc/of the curved reflector 145b may be less than 200 mm.

The height h2 of the curved reflector 145b may be changed according to the height of the inverter 165 below the partition 111. For example, the height h2 of the curved reflector 145b may be less than 15 mm or 15 mm. The thickness t2 of the curved reflector 145b may be less than the height h2 of the curved reflector 145b. For example, the thickness t2 of the curved reflector 145b may be 10 mm or less. In addition, the thickness t2 of the curved reflector 145b may be less than 15 mm.

The material of the curved reflector 145b in FIGS. 4B and 5B is substantially similar to the material of the flat reflector 145A in FIGS. 4A and 5A (for example, difference in shape), thus redundant description is omitted.

The cooking information (including operating state information) of the induction heating cooking apparatus 100 may be reflected at the front surface 145b1 of the curved reflector 145b. The front surface 145b1 of the curved reflector 145b may be treated with a film (not shown) or coated (not shown) to improve the visibility of the cooking information (including operating state information) of the induction heating cooking apparatus 100. Also, the cooking information (including operating state information) of the induction heating cooking apparatus 100 may be projected or image-formed from the front surface 145b1 of the curved reflector 145b.

An anti-shock material 147-1 between the curved reflector 145b and the top plate 120 in FIGS. 4B and 5B is substantially similar to the anti-shock material 147 between the flat reflector 145a and the top plate 120 in FIGS. 4A and 5A (for example, difference in reflector), thus redundant description is omitted.

A virtual flame generator (e.g., a plurality of light sources, a plurality of lenses corresponding to the plurality of light sources, and a light source and lens holder, etc.) in FIGS. 4B and 5B is substantially similar to the virtual flame generator (e.g., a plurality of light sources, a plurality of lenses corresponding to the plurality of light sources, and a light source and lens holder, etc.) in FIGS. 4A and 5A (for example, difference in reflector), thus redundant description is omitted.

Figure 6:
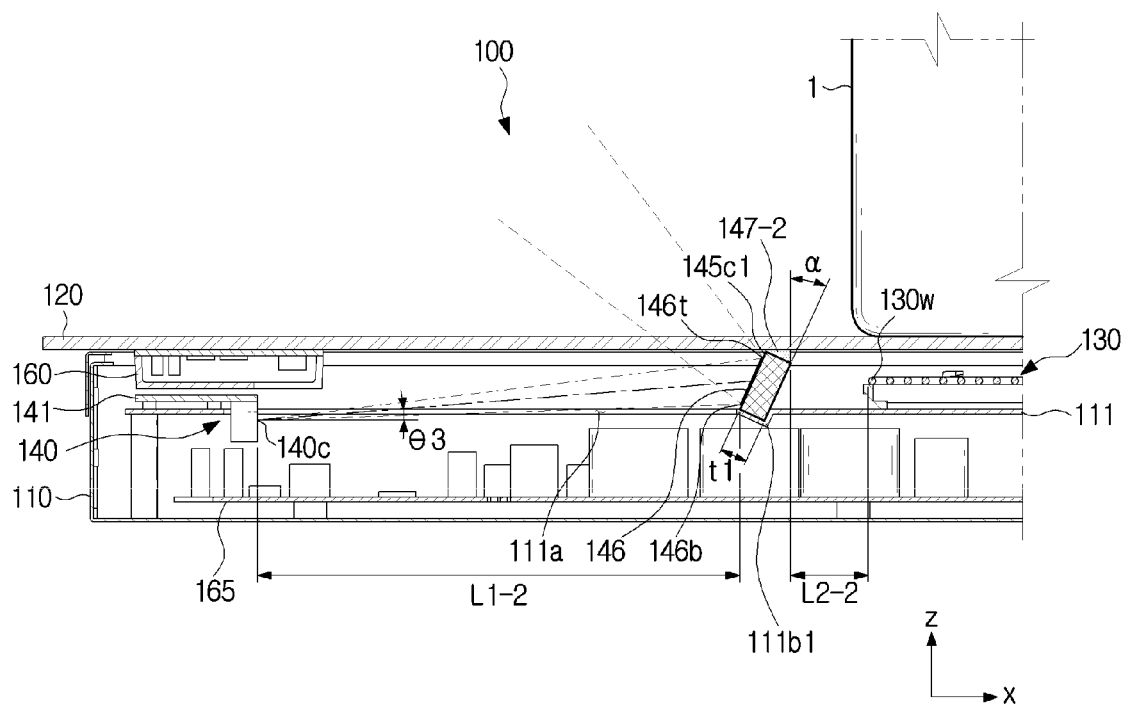
FIG. 6 is a schematic cross-sectional view of a cooking information display having a tilted reflector according to another embodiment.

FIG. 6 is a schematic cross-sectional view of a cooking information display having a tilted reflector according to another embodiment.

Referring to FIG. 6, in the cooking information display 149, a reflector 145c is tilted at a predetermined angle α (for example, 45 degrees) with respect to the vertical direction of the bottom surface 110b of the main body 110. The predetermined angle α may be greater than 1 degree and less than 55 degrees, for example, with respect to the vertical direction of the bottom surface 110b of the main body 110. The predetermined angle α may be greater than 5 degrees and less than 48 degrees, for example, with respect to the vertical direction of the bottom surface 110b of the main body 110. Also, the predetermined angle α may be changed by at least one of the manufacturer, the material of the top plate 120, and the distance between the working coils 130.

The reflector 145c tilted at the predetermined angle α may include a flat reflector that is tilted to the predetermined angle α or a curved reflector that is tilted to the predetermined angle α.

The reflector 145c tilted at the predetermined angle α may be fixed to a groove 111b1 of a partition 111-1. An angle between the partition 111-1 and the groove 111b1 may correspond to the predetermined angle α of the reflector 145c. Also, the reflector 145c tilted at the predetermined angle α may be fixed to the tilted protrusion (protruding in the direction opposite to the groove 111b1, not shown) of the partition 111-1. An angle between the partition 111-1 and the tilted projection may correspond to the predetermined angle α of the reflector 145c.

An anti-shock material 147-2 different from FIG. 5A may be positioned between the reflector 145c tilted at the predetermined angle α and the top plate 120. The anti-shock material 147-2 between the curved reflector 145b and the top plate 120 in FIG. 6 is substantially similar to the anti-shock material 147-1 in FIG. 5A (for example, difference in reflector), thus redundant description is omitted.

In accordance with an aspect of the disclosure, an induction heating cooking apparatus includes: a top plate positioned above a main body, on which a cooking container is placed; a working coil positioned below the top plate, and configured to generate a magnetic field for induction heating the cooking container; a projector positioned in front of the working coil, and configured to output cooking information; and a reflector positioned between the working coil and the projector, and configured to receive the cooking information.

According to an aspect of the disclosure, the reflector may perform one of reflecting, projecting, and image-forming the cooking information toward the top plate.

According to an aspect of the disclosure, the reflector is positioned closer to the working coil among the projector and the working coil.

According to an aspect of the disclosure, the reflector may include one of a flat reflector and a curved reflector.

According to an aspect of the disclosure, a width of the flat reflector may be greater than or equal to a diameter of the working coil.

According to an aspect of the disclosure, an arc of the curved reflector may be greater than or equal to a diameter of the working coil.

According to an aspect of the disclosure, one of the flat reflector and the curved reflector may be tilted greater than 88 degrees and less than 93 degrees with respect to the bottom surface of the main body.

According to an aspect of the disclosure, the cross-section of the reflector may include one of a convex lens, a concave lens, an ellipse, a quadrangle, or a quadrangle with rounded corners.

According to an aspect of the disclosure, a height of the reflector may be greater than a thickness of the reflector.

According to an aspect of the disclosure, the induction heating cooking apparatus may further include: a first partition positioned between the top plate and the bottom surface of the main body. The working coil and the reflector may be positioned in the first partition.

According to an aspect of the disclosure, the first partition has a material capable of shielding a magnetic field generated in the working coil.

According to an aspect of the disclosure, the first partition may include an opening. A part of the projector may be positioned through the opening.

According to an aspect of the disclosure, the cooking information may be output from the projector at a predetermined angle to the reflector.

According to an aspect of the disclosure, the cooking information may include operating state information of the induction heating cooking apparatus.

According to an aspect of the disclosure, the top plate may include a clearance area. The cooking information may be provided through the opening clearance area.

According to an aspect of the disclosure, an anti-shock material may be positioned between the top plate and the reflector.

According to an aspect of the disclosure, the induction heating cooking apparatus may further include: a second partition positioned between the top plate and the bottom surface of the main body. The second partition may include one of a groove and a protrusion corresponding to the reflector that is tilted at a predetermined angle.

According to an aspect of the disclosure, when the number of the working coils is plural, the diameter of at least one working coil among the plurality of working coils may be different from the diameter of the other working coils.

In accordance with an aspect of the disclosure, a method of displaying cooking information of an induction heating cooking apparatus, includes: receiving from a control panel a user input corresponding to heating of a cooking container placed on a top plate; generating a magnetic field in a working coil positioned below the top plate and induction heating the cooking container corresponding to the user input; displaying first cooking information corresponding to the user input on a display of the control panel; and outputting second cooking information corresponding to the user input from a projector to a reflector positioned between the working coil and the projector.

Figure 7:
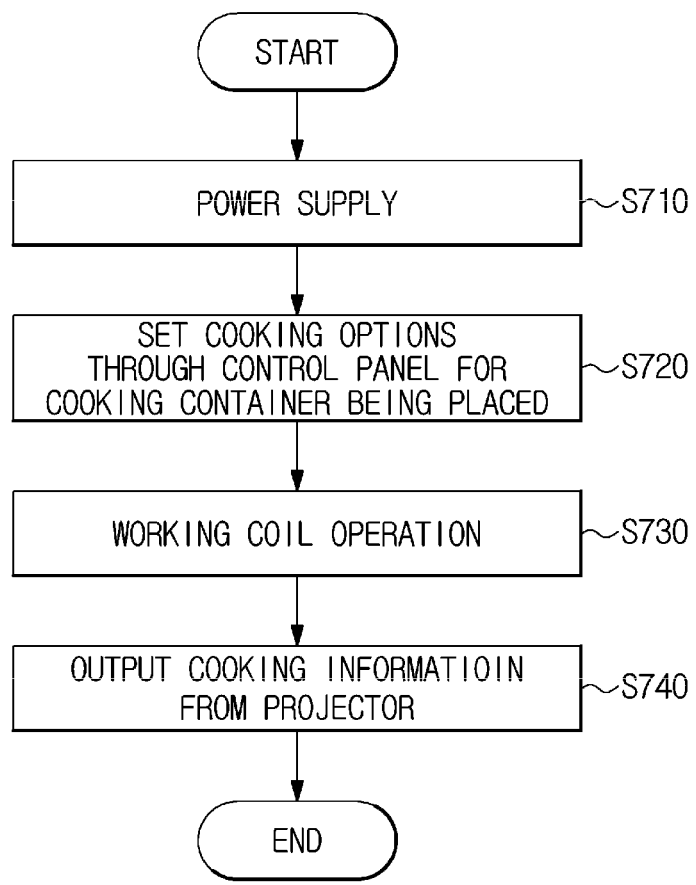
FIG. 7 is a schematic flowchart illustrating a method of displaying cooking information of the induction heating cooking apparatus according to an embodiment.

FIG. 7 is a schematic flowchart illustrating a method of displaying cooking information of the induction heating cooking apparatus according to an embodiment.

In step S710 of FIG. 7, the power of the induction heating cooking apparatus 100 is supplied.

The user may touch the power on/off button 148a of the control panel 148 (see FIG. 1A). The processor 161 may supply power to the induction heating cooking apparatus 100 in response to the touch of the power on/off button 148a. The processor 161 may control the power supply 170 to supply power to the induction heating cooking apparatus 100 in response to the touch of the power on/off button 148a.

In step S720 of FIG. 7, cooking options are set in the control panel 148 for the cooking container 1 placed on the top plate 120.

The user may enter cooking options for the cooking container 1 placed on the top plate 120 through the control panel 148 (see FIG. 1A). For example, the user may touch the increment/decrement buttons 148c1 and 148c2 and the timer button 148d of the control panel 148. The user may also touch the burner selection switch (not shown), the dial switch (or magnetic knob), or the thermal switch (not shown) of the control panel 148.

The processor 161 may store (or temporarily store) a predetermined cooking option in the storage 180.

In step S730 of FIG. 7, the working coil 130 may operate.

The processor 161 may control the inverter 165 in response to the predetermined cooking option. A high-frequency alternating current is applied from the inverter 165 in correspondence with the cooking option predetermined in the working coil 130. The working coil 130 may be operated by the applied high-frequency alternating current. The cooking container 1 is induction-heated by the high-frequency alternating current applied to the working coil 130.

In step S740 of FIG. 7, the cooking information is outputted from the projector 140.

The processor 161 may output the cooking information corresponding to the predetermined cooking option through the projector 140. The cooking information output from the projector 140 may be referred to as the second cooking information. The cooking information corresponding to the predetermined cooking option may include, for example, the temperature of the cooking container 1, the cooking elapsed time and/or the date/time. The temperature of the cooking container 1 may be detected through the sensor 169. The cooking elapsed time may be calculated through at least one of a control panel input time of the user and an operation start time of the working coil 130.

The processor 161 may externally output (or project, image-form) the cooking information implemented with one or a combination of text, images, symbols, and moving images corresponding to the cooking option stored in the storage 180 through the projector 140.

The reflector 145 may receive the cooking information output from the projector 140. The cooking information received by the reflector 145 may be reflected, projected, or image-formed.

The display 148c of the control panel 148 may operate independently of the output of the cooking information from the projector 140. The cooking information corresponding to the user input received from the control panel 148 may be displayed on the display 148c under the control of the processor 161. The cooking information displayed on the display 148c may be referred to as the first cooking information. The order of the first cooking information and the second cooking information may be changed.

The information (or a part of the cooking information) displayed on the control panel 148 may be different from the information (or the cooking information) output from the projector 140. The cooking information output from the display 148c, which is the output area of the control panel 148, and the projector 140 may be different. The cooking information output to the control panel 148 and the projector 140 may be different from each other.

In accordance with another aspect of the disclosure, a method of displaying cooking information of an induction heating cooking apparatus includes: receiving from a control panel a user input corresponding to heating of a cooking container placed on a top plate; generating a magnetic field in a working coil positioned below the top plate and induction heating the cooking container corresponding to the user input; displaying first cooking information corresponding to the user input on a display of the control panel; and outputting second cooking information corresponding to the user input from a projector to a reflector positioned between the working coil and the projector.

In step S740 of FIG. 7, when the cooking information is outputted from the projector 140, a method of displaying cooking information of the induction heating cooking apparatus 100 is ended.

The methods according to exemplary embodiments of the disclosure may be implemented in the form of program instructions that can be executed by various computer devices and recorded on a computer readable medium. The computer readable medium may include program instructions, data files, data structures, and the like, alone or in combination. For example, the computer readable medium may be a volatile or nonvolatile storage device, such as a storage device, such as ROM, whether erasable or rewritable, or a memory such as, for example, RANI, a memory chip, or an integrated circuit, or a storage medium readable by a machine (e.g., a computer) as well as being optically or magnetically recordable, such as a CD, a DVD, a magnetic disk, or a magnetic tape.

It will be appreciated that the memory that may be included in the induction heating cooking apparatus is an example of a machine-readable storage medium suitable for storing programs or programs containing instructions implementing the embodiments of the disclosure. The program instructions recorded on the medium may be those specially designed and configured for the disclosure or may be available to those skilled in the art of computer software.

The foregoing detailed description is intended to illustrate and explain the preferred embodiments of the disclosure, and the disclosure may be used in various other combinations, modifications, and environments. That is, it is possible to make changes or modifications within the scope of the concept of the above-described disclosure, within an equivalent scope to the above-described disclosure, and/or within the skill or knowledge of the art.

Therefore, the detailed description of the disclosure is not intended to limit the disclosure to the disclosed embodiments. It is also to be understood that the appended claims are construed to cover further embodiments.

INDUSTRIAL APPLICABILITY

As described above, the disclosure may provide the induction heating cooking apparatus capable of recognizing the cooking information provided from below the top plate through a projector and the reflector inside the main body on the top plate by the user, and the method of displaying cooking information of the induction heating cooking apparatus.

The invention claimed is:

1. An induction heating cooking apparatus comprising:
a top plate positioned above a main body, on which a cooking container is placed;
a partition positioned between the top plate and a bottom surface of the main body;
a working coil positioned below the top plate and above the partition, and configured to generate a magnetic field for induction heating the cooking container;
a projector positioned in front of the working coil underneath the top plate, and configured to output cooking information; and
a reflector positioned below the top plate, above the partition, and between the working coil and the projector, and configured to receive the cooking information,
wherein the reflector is configured to perform one of reflecting, projecting, or image-forming the cooking information toward the top plate, and
wherein a part of the projector is positioned above the partition through an opening of the partition, and another part of the projector is positioned below the partition through the opening of the partition.

2. The induction heating cooking apparatus according to claim 1, wherein the reflector is positioned closer to the working coil among the projector and the working coil.

3. The induction heating cooking apparatus according to claim 1, wherein the reflector comprises one of a flat reflector and a curved reflector.

4. The induction heating cooking apparatus according to claim 3, wherein a width of the flat reflector is greater than or equal to a diameter of the working coil.

5. The induction heating cooking apparatus according to claim 3, wherein an arc of the curved reflector is greater than or equal to a diameter of the working coil.

6. The induction heating cooking apparatus according to claim 3, wherein one of the flat reflector and the curved reflector is configured to be tilted greater than 88 degrees and less than 93 degrees with respect to the bottom surface of the main body.

7. The induction heating cooking apparatus according to claim 1, wherein a cross-section of the reflector comprises one of a convex lens, a concave lens, an ellipse, a quadrangle, or a quadrangle with rounded corners.

8. The induction heating cooking apparatus according to claim 1, wherein the partition is configured to have a material capable of shielding the magnetic field generated in the working coil.

9. The induction heating cooking apparatus according to claim 1, wherein the cooking information is output from the projector at a predetermined angle to the reflector.

10. The induction heating cooking apparatus according to claim 1,
wherein the top plate comprises a clearance area, and
wherein the cooking information is provided through an opening clearance area.

11. The induction heating cooking apparatus according to claim 1, wherein the partition comprises one of a groove and a protrusion corresponding to the reflector that is tilted at a predetermined angle.

12. A method of displaying cooking information of an induction heating cooking apparatus comprising:
receiving from a control panel a user input corresponding to heating of a cooking container placed on a top plate;
generating a magnetic field in a working coil positioned below the top plate and induction heating the cooking container corresponding to the user input;
displaying first cooking information corresponding to the user input on a display of the control panel; and
outputting second cooking information corresponding to the user input from a projector positioned underneath the top plate to a reflector positioned underneath the top plate between the working coil and the projector,
wherein the reflector is configured to perform one of reflecting, projecting, or image-forming the cooking information toward the top plate,
wherein the induction heating cooking apparatus comprises a partition positioned below the top plate and a bottom surface of a main body of the induction heating cooking apparatus, and
wherein the working coil is positioned below the top plate and above the partition, the reflector is positioned below the top plate and above the partition, a part of the projector is positioned above the partition through an opening of the partition, and another part of the projector is positioned below the partition through the opening of the partition.

* * * * *